US010825460B1

(12) United States Patent
Ramalho et al.

(10) Patent No.: US 10,825,460 B1
(45) Date of Patent: Nov. 3, 2020

(54) AUDIO FINGERPRINTING FOR MEETING SERVICES

(71) Applicant: Cisco Technology, Inc., San Jose, CA (US)

(72) Inventors: Michael A. Ramalho, Lakewood Ranch, FL (US); Jonathan Rosenberg, Freehold, NJ (US); Keith Griffin, Oranmore (IE); Niall L McDonnell, Salthill (IE); Liam Frawley, Oranmore (IE); Martin Bernard Feeney, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/503,081

(22) Filed: Jul. 3, 2019

(51) Int. Cl.
*G10L 19/018* (2013.01)
*G10L 25/06* (2013.01)

(52) U.S. Cl.
CPC .......... *G10L 19/018* (2013.01); *G10L 25/06* (2013.01)

(58) Field of Classification Search
CPC ........ H04M 3/568; H04M 3/569; H04M 9/02; H04M 9/08; H04M 9/082; H04M 9/085
See application file for complete search history.

(56) References Cited

U.S. PATENT DOCUMENTS

| 8,488,745 | B2 | 7/2013 | Cutler | |
|---|---|---|---|---|
| 9,215,543 | B2 | 12/2015 | Sun et al. | |
| 9,538,299 | B2 | 1/2017 | Alcorn et al. | |
| 9,912,373 | B1 | 3/2018 | Wang | |
| 2003/0086341 | A1* | 5/2003 | Wells | G10L 15/26 369/13.56 |
| 2008/0160977 | A1* | 7/2008 | Ahmaniemi | H04L 12/1822 455/416 |
| 2013/0139673 | A1* | 6/2013 | Ellis | G10H 1/40 84/609 |
| 2014/0188487 | A1* | 7/2014 | Perez Gonzalez | G10L 25/18 704/500 |
| 2016/0014373 | A1* | 1/2016 | LaFata | H04N 7/152 348/14.08 |
| 2017/0111737 | A1* | 4/2017 | Painter | H04R 3/04 |

FOREIGN PATENT DOCUMENTS

WO    WO 2018/009209    1/2018

\* cited by examiner

*Primary Examiner* — Walter F Briney, III
(74) *Attorney, Agent, or Firm* — Cisco Technology, Inc.

(57) ABSTRACT

The present technology can receive audio segments from sources within one or more conference room, and can create audio fingerprints from the sources. The audio fingerprints are optimized for audio in conference room environments, which include distortions from room impulse responses, and various encoding used by telecommunication networks. In some embodiments, when two audio segments are matched, a user equipment can be instructed to mute its speakers to avoid feedback. In some embodiments, when two audio segments are matched, a user equipment can be given instructions to join a conference taking place in the room in when the audio segment originated.

20 Claims, 8 Drawing Sheets

AUDIO FINGERPRINTING FOR MEETING SERVICES

TECHNICAL FIELD

The present technology pertains to matching audio segments from different sources and more specifically pertains to an audio fingerprint technique that is optimized to handle audio segments in a teleconference and uses thereof.

BACKGROUND

Matching audio segments, which is often referred to as audio fingerprinting is a known mechanism for identifying music. Applications for this purpose, like SHAZAM, can record a segment of a song, and use the recorded segment to identify the name and artist of the song. While audio fingerprinting, in general, is a known technique, it does not work very well for some applications and in some environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
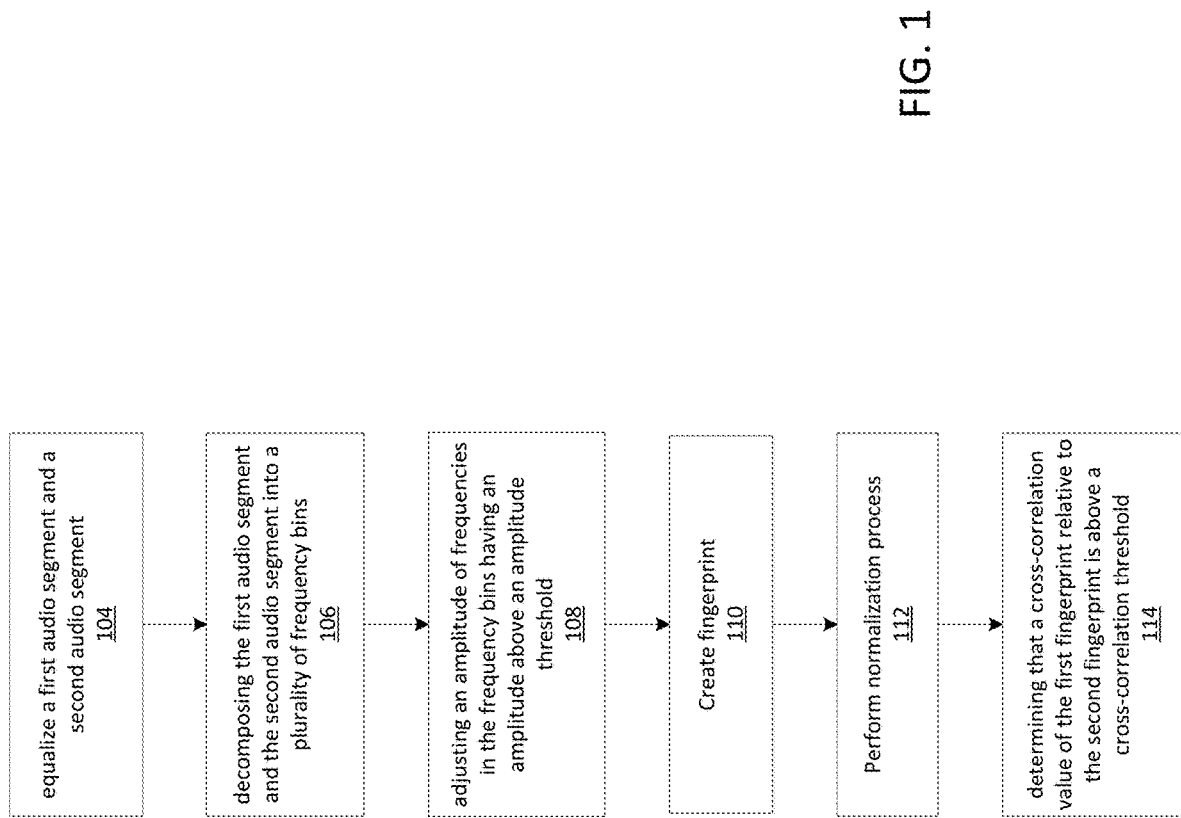
FIG. 1 illustrates an example method embodiment for generating and comparing audio fingerprints for conference room audio in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to matching conference room audio samples. In some embodiments an audio fingerprint service of the present technology can decompose a first audio segment and a second audio segment into a plurality of frequency bins within the range of frequencies used in a public switched telephone network (PSTN). The audio fingerprint service can adjust an amplitude of frequencies in the frequency bins having an amplitude above an amplitude threshold, and can determine that a cross-correlation value of the decomposed and adjusted first audio segment relative to the decomposed and adjusted second audio segment is above a cross-correlation threshold.

In some embodiments, the first audio segment is recorded by a first computing device in a meeting environment, wherein the first audio segment was received from a conference service and was played by a conference speaker in the meeting environment with the computing device. The audio fingerprint service can prevent playback of the second audio segment by the first computing device in response to the determination that the cross-correlation value is above the cross-correlation threshold, wherein the second audio segment was received from the conference service.

In some embodiments, the first audio segment is received from a first source, and the second audio segment is received from a second source. The audio fingerprint service can determine that the cross-correlation value between the first audio segment and the second audio segment is above the cross-correlation threshold, and thereby determine that the first source and the second source are in a same meeting environment.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art for an audio fingerprint technology that can match audio segments in a conference environment. While other audio fingerprint technologies exist, such as to identify music, these technologies are not optimized for a conference environment.

Music identification audio fingerprint technologies are optimized for an environment wherein the audio is characterized by high acoustic energy, and the audio fingerprint needs to be compared against a very large database. This means that audio fingerprints for music identification invest computing power in creating a small fingerprint for quick and efficient, low complexity comparisons.

Conversely, the present technology is optimized for a conference room environment and use cases for audio fingerprints in a conference environment. A conference environment is characterized by audio that is mainly in the form of human speech, which is characterized by relatively low acoustic energy. The speech is also subject to room impulse responses (each room has its own room impulse response profile that affects audio as it reflects off of surfaces in the room) before it is recorded by a microphone. Additionally, the speech that is recorded by the microphone is then encoded and transmitted over a network (Voice Over IP (VOIP) or Public Switched Telephone Network (PSTN)) which results in degradation of audio quality due to the encoding used to send the audio over the network. There is a delay due to processing and transmission of the audio to a conference service and back to endpoints as well. Finally, a conference is subject to environmental noise from the noise outside the conference environment (nearby coworkers or other meetings, nearby construction, etc.) and within (fans within electronic devices, the squeaking of chairs and papers, etc.). Audio fingerprints use for in a conference room environment can require less computation at capture, which can result in a larger fingerprint, because the audio fingerprint only needs to be compared against a small number of samples. Additionally, audio fingerprints for the use cases addressed herein require fast capture since they are to be compared against a database of fingerprints being captured at approximately the same time.

The present technology processes candidate audio segments to account for the characteristics of audio segments recorded in a conference environment, and utilizes a matching methodology that is optimized for audio segments recorded in a conference environment, to match audio segments coming from the same conference environment consistently.

The present technology can utilize the audio fingerprint technology that is optimized for the conference environment to provide services to a meeting participant when the participant is joining the meeting.

In some embodiments, the optimized audio fingerprint technology can be executed on a user equipment that is being used to join a conference, and the user equipment can determine that its microphone is picking up the same audio segments as it is receiving from a conference service, and can mute its speakers to avoid the dreaded reverberating screech that occurs from feedback when the sound emitted from the speakers feeds into the microphone, and then loops and amplifies repeatedly.

In some embodiments, the optimized audio fingerprint technology can be executed on a meeting room identification service to determine that an audio segment being recorded by a user equipment is the same as the meeting room identification service is receiving from a particular conference room with a conference occurring in it. The meeting room identification service can then assist the user equipment to automatically connect to the conference since the user equipment must be in that meeting room.

FIG. 1 illustrates an example audio fingerprint method that is optimized for audio recorded in a conference room environment. The method begins by equalizing (104) a first recorded audio segment and a second recorded audio segment. The equalizing (104) of the audio segments serves to normalize the input audio segments, so they are more easily comparable. The method of equalizing the audio segments can be chosen from among those known in the art that can scale the input signal(s) to make them more similar to what is audible to humans, and that can reduce noise in the audio segments.

The equalized (104) audio segments are then decomposed (106) into a plurality of frequency bins. The audio segments are decomposed (106) by using a Short-Term Fourier Transform (STFT) on both audio segments to create a time-frequency representation of each of the audio segments broken out into frequency windows. Additionally, the STFT output can be limited to a particular frequency range of interest.

In some embodiments, the present technology uses a 20 ms STFT, which analyses the input audio segments in 20 ms chunks, but other segment durations can be used as well.

Figure 3:
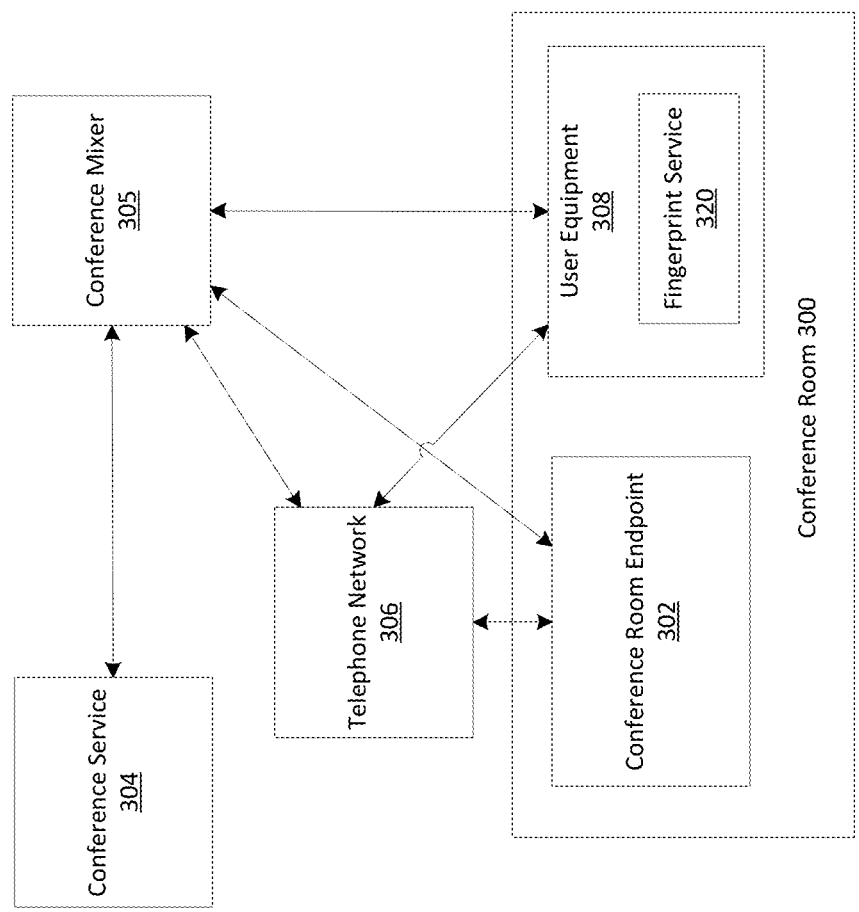
FIG. 3 illustrates an example system embodiment for determining when user equipment is attempting to join a conference in a conference room already playing conference audio in accordance with some aspects of the present technology.
Figure 5:
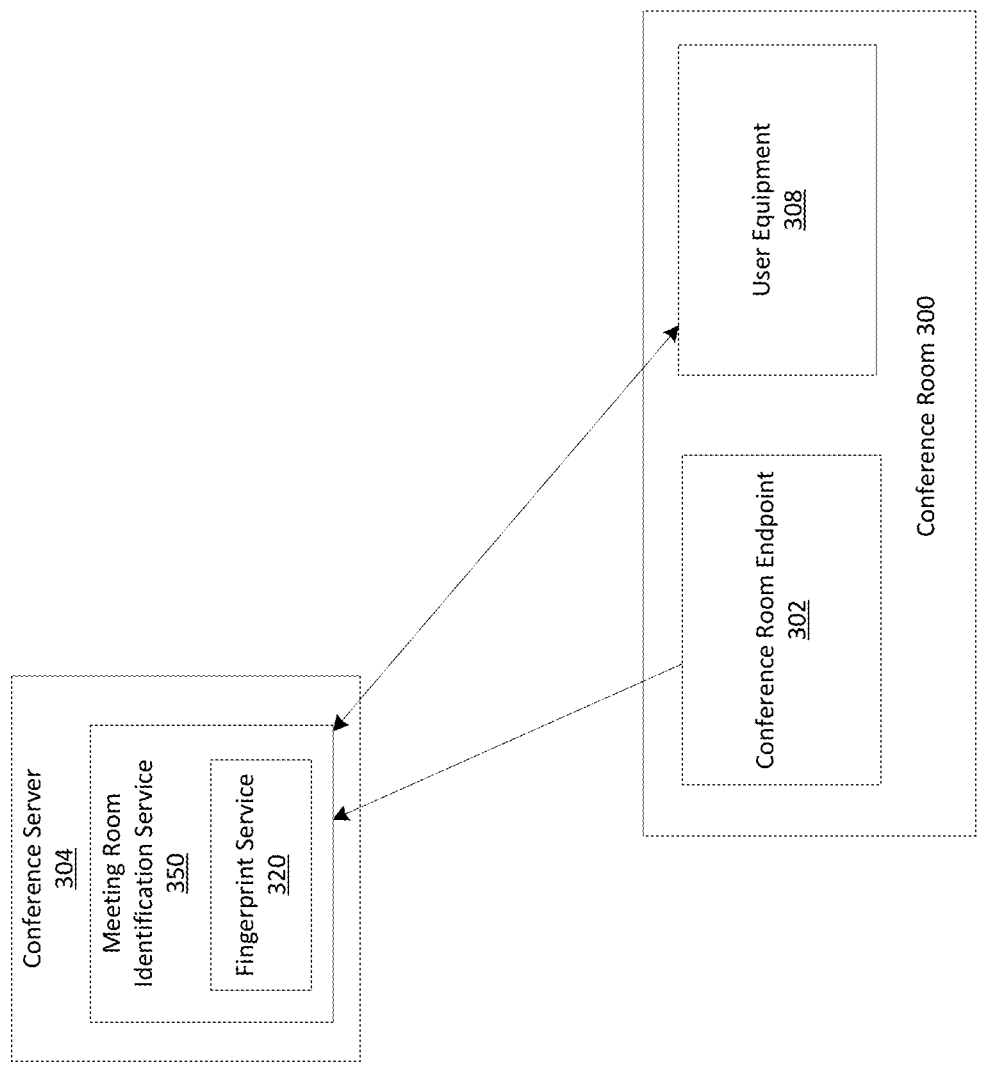
FIG. 5 illustrates an example system embodiment for determining a conference room in which user equipment is present when the user equipment is in a conference room reporting audio to a meeting room identification service in accordance with some aspects of the present technology.

In some embodiments, the present technology also attempts to account for the fact that the audio segments might take a different amount of time to reach an audio fingerprint service (320 in FIG. 3 and FIG. 5). For example, a first audio segment that is recorded in a conference room by a first microphone (e.g., part of conference room endpoint 302 in FIG. 3 and FIG. 5), and a second audio segment that is recorded in the same conference room (e.g., conference room 300 in FIG. 3 and FIG. 5) by a different microphone (e.g., part of user equipment 308 in FIG. 3 and FIG. 5) might both reach the fingerprint service at different times, even when the first audio segment and the second audio segment were both recorded at the same time (and recorded the same sounds). The first audio segment and the second audio segment might reach the fingerprint service a different time because each signal might take different paths through a network, or might traverse different networks.

To account for the likelihood that the audio segments might take a different amount of time to reach the audio fingerprint service, the start of the audio segments can be adjusted before being decomposed (106) by the STFT. For example, the segments start times can be adjusted in 10 ms increments. This would result in the first audio segment becoming multiple samples each with different start times adjusted by 10 ms increments. The same processing can be performed on the second audio segment. The result is that several audio samples need to be compared to each other instead of just two.

Another mechanism that can be employed to account for the likelihood that the audio segments might take a different amount of time to reach the audio fingerprint service is to fade-in the start of the audio segment and fade-out the end of the audio segment. This can be done by adjusting the amplitude of the start and end of the segments, or by using other methods to give less importance to the start and the end of an audio segment.

Since the audio fingerprint service 320 is optimized to compare audio segments from a conference call (audio only, or audio-video), the STFT can be limited to outputting decomposed (106) audio in frequency bins that are present within the PTSN narrowband range (i.e., 250-3300 Hz). This focuses the range of frequencies of interest to the range of frequencies used in a traditional telephone network.

After decomposing (106) the audio segments into the plurality of frequency bins, the fingerprint service 320 can adjust (108) the amplitude of the frequencies in the frequency bins having an amplitude above an amplitude threshold. This process can be referred to as whitening or flattening the spectrum of the audio samples. In this process, the highest amplitudes are reduced or cut off, which gives greater influence or representation to frequencies with lower amplitudes. Whitening or flattening the spectrum enhances low-level spectral components of the audio signals and attenuates high-level ones. This prevents a few frequencies having very high amplitudes from being viewed as the predominant characteristic of the audio signals. In some embodiments, the threshold amplitude can be 0.1 dB, wherein the maximum amplitude that can be represented for any frequency will be 0.1 dB or less.

Next, the audio samples are turned into fingerprints (110). In some embodiments, the fingerprints are created (110) by zeroing out the lowest x % of the data points in each frequency bin (output by the STFT (106)). In some embodiments, the fingerprints are created (110) by calculating the energy in each bin, and the keeping the bins representing at least a threshold amount of the total energy of the audio segment. Other techniques can also be used to create the audio fingerprint.

The audio fingerprints can then be normalized (112), and then compared to determine (114) a cross-correlation value of the first fingerprint as compared to the second fingerprint. When the determined (114) cross-correlation value is greater than a threshold, the audio fingerprints can be considered as coming from the same meeting (they contain the same audio content). The cross-correlation value is a measure of how similar one fingerprint is to another fingerprint. In some embodiments, any cross-correlation score less than 0.3 indicates that the samples are not from the same meeting. In some embodiments, any cross-correlation score less than 0.5 indicates that the samples are not from the same meeting. In some embodiments, any cross-correlation score less than 0.6 indicates that the samples are not from the same meeting.

The method described with respect to FIG. 1 was arrived upon by modeling speech samples (more than 500 sentences spoken) from two different sources and the speech samples were modified with 49 different room impulse responses, and modified with various encodings that the speech might encounter as applied by the conference service, a VOIP network, or a PTSN network. The samples were further mixed with environmental sources.

Figure 2A:
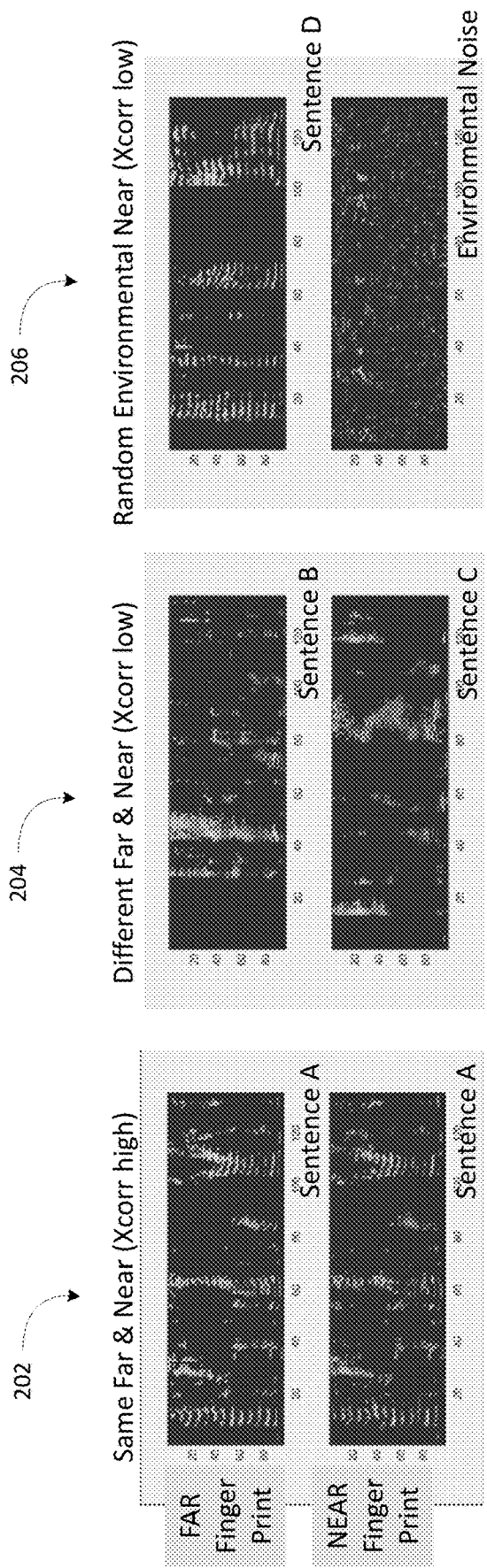
FIG. 2A illustrates example comparisons of spectrogram representations of audio fingerprints in accordance with some aspects of the present technology.

FIG. 2A shows examples of spectrogram pairs showing a one audio sample (far fingerprint—referring to an audio sample coming from a conference service) and another audio sample (near fingerprint—referring to an audio sample recorded in a conference room by user equipment). The samples 202 show audio fingerprints for the same speech being spoken at both sources. The audio fingerprints look very similar, and the cross-correlation value is high. The samples 204 show a different sentence spoken at the respective sources. The audio fingerprints look different, and the cross-correlation value is low. The samples 206 show a sentence spoken compared to environmental noise. Again the audio fingerprints look different, and the cross-correlation values are low.

Figure 2B:
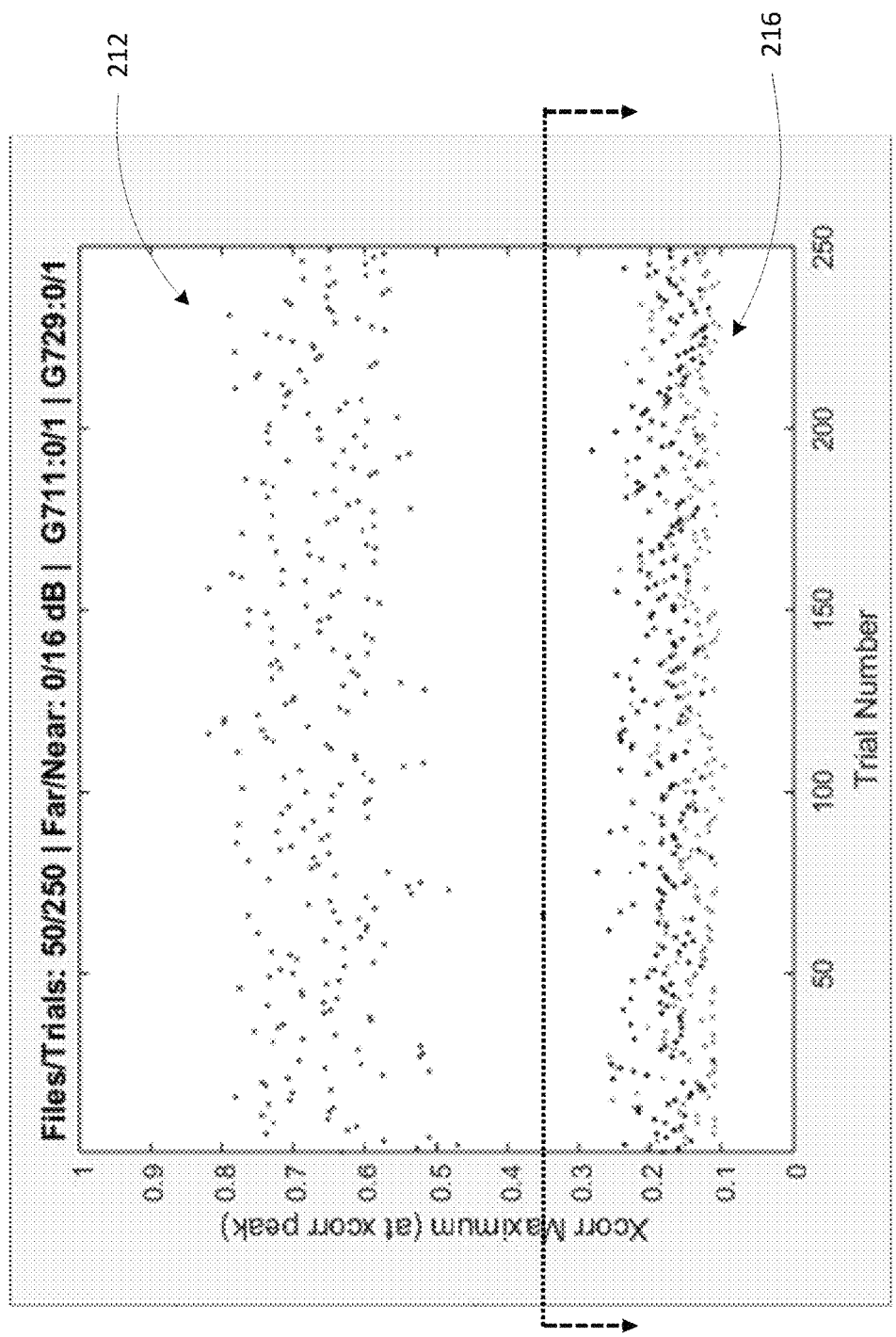
FIG. 2B illustrates an example plot of cross-correlation values from comparisons of audio fingerprints for conference room audio in accordance with some aspects of the present technology.

FIG. 2B illustrates a graph showing the results of 250 comparisons of samples using the method described with respect to FIG. 1. The graph shows that the algorithm described in FIG. 1 provides sufficient separation between samples that do not include the same sentence 216 and samples that do include the same sentence 212. Specifically, all samples that do not include the same sentence have a cross-correlation score less than about 0.3, and clearly less than 0.35. Samples that include the same sentence have cross-correlation values greater than about 0.5, and clearly greater than 0.35.

Note that a reason that samples including the same sentence do not have cross-correlation values of 1 or even 0.9 is that the samples are different due to the fact that different samples with the same sentences had different room impulse responses and/or different encodings applied which changes the audio characteristics of these samples. Nevertheless, experimentation shows that 100% of all samples having a cross-correlation value less than 0.35 do not include the same sentence.

Figure 4:
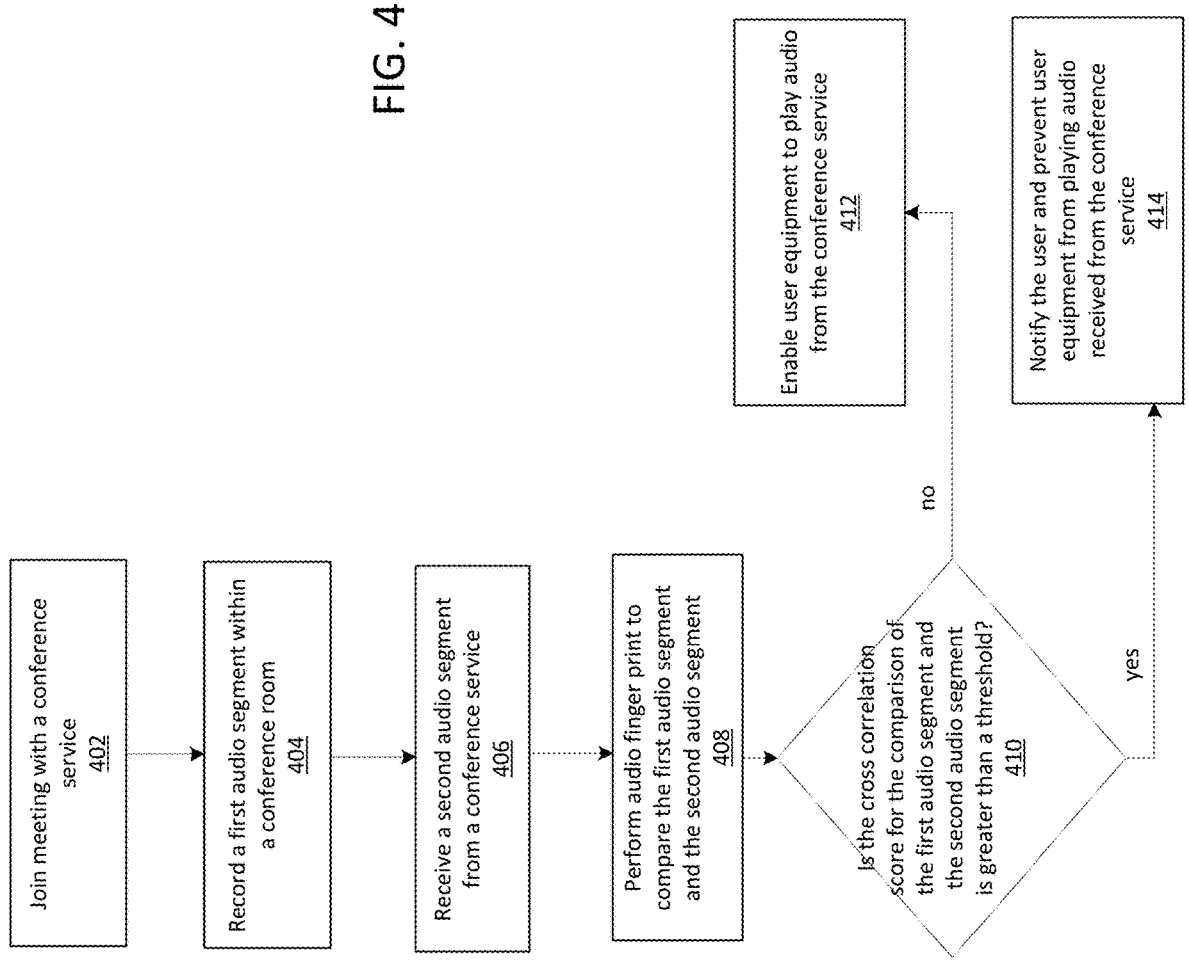
FIG. 4 illustrates an example method embodiment for determining when user equipment is attempting to join a conference in a conference room already playing conference audio in accordance with some aspects of the present technology.

As introduced above, the present technology can be useful to offer services to participants of a conference. FIG. 3 illustrates a system, and FIG. 4 illustrates a method to prevent feedback that occurs when a microphone records audio to be sent to the conference service where that audio was played on another device in the same conference room that receives the audio from the same conference service.

While the embodiments illustrated in FIG. 3 and FIG. 4 will be discussed with reference to each other, neither figure should be interpreted to limit embodiments in the other figure unless otherwise defined in the appended claims.

FIG. 3 shows an environment wherein a conference is taking place in a conference room 300. Conference room 300 includes a conference room endpoint 302, which can be a speaker and microphone (of a video conference system, of a speakerphone, or of another computing device in the conference room 300) playing audio from/sending audio to a conference service 304. As illustrated in FIG. 3 the audio from the conference service 304 can take one of two paths to the conference room endpoint 302. Audio coming from the conference service 304 is first sent to a conference mixer 305. Conference mixer 305 sends conference audio across the appropriate network to reach an endpoint. For example, if the conference room endpoint 302 is a VOIP device, the conference mixer 305 will encode conference audio for transmission across an IP network. If the conference room endpoint 302 is a telephony device, the conference mixer 305 will encode conference audio for transmission across a telephone network 306.

User equipment 308 can be a conference participant's laptop computer, tablet, or mobile phone. It is common for a conference participant to bring user equipment 308 to a meeting especially when the meeting might also include document sharing or where the user equipment 308 is required to access other conference services. Sometimes, when a conference participant joins a conference with user equipment 308, conference audio will begin to play from the user equipment 308 which will be picked up by the conference room endpoint 302 and cause feedback. Accordingly, the present technology can be useful to help the user equipment 308 determine that it is joining a conference where audio for the conference is already playing in conference room 300, and therefore user equipment 308 should mute its speakers.

Accordingly, as illustrated in FIG. 4 user equipment 308 can join a meeting (402) with conference service 304. Before user equipment 308 plays any audio received from conference service 304, user equipment 308 can record (404) a first audio segment within conference room 300. Nearly simultaneously user equipment 308 can receive (406) a second audio segment from conference service 304. A fingerprint service 320 executing on user equipment 308 can receive both the first audio segment and the second audio segment and perform (408) audio fingerprinting methodology to compare the first audio segment and the second audio segment. When fingerprint service 320 determines (410) that the core cross-correlation score for the comparison of the first audio segment in the second audio segment is not than a threshold, fingerprint service 320 can enable (412) user equipment 308 to play audio received from the conference service 304. However, when fingerprint service 320 determines (410) that the cross-correlation score for the comparison of the first audio segment and the second audio segment is greater than a threshold, fingerprint service 320 can cause user equipment 308 to notify the user and prevent user equipment (414) from playing audio received from the conference service.

In some embodiments, the creation of the audio fingerprints and comparison of the first audio segment and the second audio segment and the determination of the cross-correlation score as described in steps 408 and step 410 can be performed using the method described with respect to FIG. 1.

In some embodiments, the threshold (at step 410) can be a cross-correlation value of 0.35. Any comparison less than a cross-correlation value of 0.35 strongly indicates that the two audio segments do not include the same sentence. However, in some embodiments, a cross-correlation value of 0.35 might not be sufficient to conclude that the two audio segments include the same sentence. In some embodiments, if a cross-correlation value of 0.35-0.59 is obtained, further samples can be obtained and compared to provide added confidence.

Figure 6:
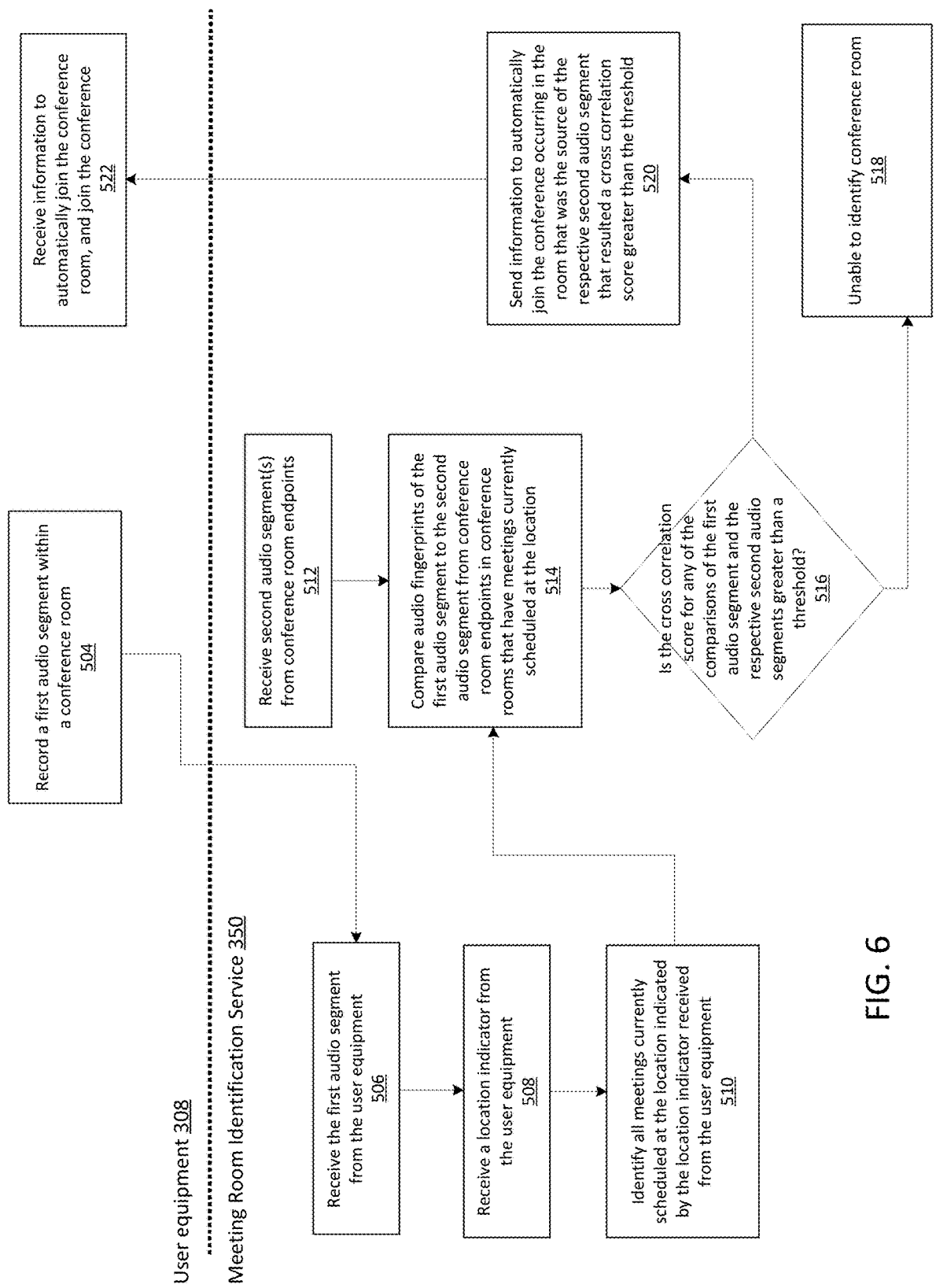
FIG. 6 illustrates an example method embodiment for determining a conference room in which user equipment is present when the user equipment is in a conference room reporting audio to a meeting room identification service in accordance with some aspects of the present technology.

FIG. 5 illustrates an example system and FIG. 6 illustrates an example method for providing another service enabled by using audio fingerprinting technology in a conference environment. In this example, when it is determined that user equipment 308 has recorded the same audio as has been recorded by the conference room endpoint 302, it can be concluded that user equipment 308 and conference room endpoint 302 are both in conference room 300 at the same time. Since user equipment 308 is in conference room 300, user equipment 308 can be enabled to join a conference taking place in conference room 300 automatically.

While the embodiments illustrated in FIG. 5 and FIG. 6 will be discussed with reference to each other, neither figure should be interpreted to limit embodiments in the other figure unless otherwise defined in the appended claims.

FIG. 5 illustrates substantially the same environment as illustrated in FIG. 3 except that in FIG. 5 the conference service 304 includes a meeting room identification service 350, and the fingerprint service 320 is part of the meeting room identification service 350.

In FIG. 6 the method is divided by steps performed by user equipment 308 (steps 504, and 522) and steps performed by meeting room identification service 350 (steps 506, 508, 510, 512, 514, 516, 518, and 520).

The method illustrated in FIG. 6 begins when a user enters a meeting room with user equipment 308, and user equipment 308 records (504) a first audio segment within conference room 300. User equipment 308 then sends the recorded first audio segment to the meeting room identification service 350 which receives (506) the first audio segment from the user equipment 308. Meeting room identification service 350 can also receive (508) a location indicator from user equipment 308.

The meeting room identification service 350 can use the location indicator received (508) to identify (510) all meetings currently scheduled at or near the location indicated by the location indicator. Steps 508 and 510 can be optional, but when performed they can serve to limit the number of audio samples that meeting room identification service 350 will need to compare to determine if user equipment 308 is in a meeting room for which a conference hosted by conference service 304 is occurring. For example, if conference service 304 is a large conference service provider, a large number of meetings can be hosted by conference service 304 (or other instances thereof). Therefore, when a location indicator is provided by user equipment 308, meeting room identification service 350 can narrow the number of potential conferences that the user equipment 308 may be attending to only conferences occurring a nearby building, or in some instances may be able to narrow the number of potential conferences that the user equipment 308 may be attending to only a conferences occurring on a particular floor or wing of a building. This can greatly reduce the number of candidate meetings that need to be compared with the first audio segment received (506) from the user equipment 308.

Meanwhile, the meeting room identification service 350 can continuously, or intermittently, be receiving (512) audio segments from conference room endpoint 302.

Next the fingerprint service 320 that is part of meeting room identification service 350, can compare (514) the audio fingerprint of first audio segment from the user equipment 308 to the audio fingerprint of the second audio segments from conference room endpoints received from conference rooms that have meetings currently scheduled or occurring at the location indicated from the received (508) location indicator.

When the cross-correlation score for any of the comparisons of the first audio segment and the respective second audio segment is less than a threshold (516), the meeting room identification service 350 is unable (518) to identify the conference room 300 which user equipment 308 may be in. However, when the meeting room identification service 350 determines (516) that the cross-correlation score for one of the comparisons of the first audio segment and the respective second audio segment is greater than a threshold, meeting room identification service 350 can send (520) information to user equipment 308 to automatically join the conference occurring in the conference room 300.

In some embodiments, the cross-correlation value threshold is at least 0.35. However, in some embodiments, the cross-correlation value threshold could be higher in this embodiment since the audio recorded in the embodiment described in FIG. 5 and FIG. 6 should at least have similar room impulse responses, as the audio segments are both recorded from the same meeting room (for a successful match). It is also possible that additional comparisons can be conducted when the cross-correlation value is over the threshold, but relatively low.

The user equipment 308 can receive (522) the information to automatically join the conference taking place in conference room 300 and can join the conference.

While the method of FIG. 6 has been described in the context of the system of FIG. 5, it should be appreciated that it is not necessary that the conference service 304 exist. Or, at least, it is not necessary that the conference room endpoint 302 and user equipment 308 are participating in a meeting hosted by conference service 304. In some embodiments, the present technology can be used to connect the user equipment 308 to devices local to conference room 300. For example, conference room endpoint 302 can record audio from conference room 302 and send this to the meeting room identification service 350. Meeting room identification service can then use audio segments received from user equipment 308 to determine which conference room user equipment 308 is in. Meeting room identification service 350 can then send instructions for connecting to devices within the conference room 300, such as a display device.

While, in some embodiments, the present technology has including the sending of audio segments from one device to another (such as, e.g., the conference room endpoint 302 and the user equipment 308 sending audio segments to the meeting room identification service 350), it should be appreciated that the devices could create fingerprints according to the methods described herein and send the audio fingerprints instead of the audio segments.

Figure 7:
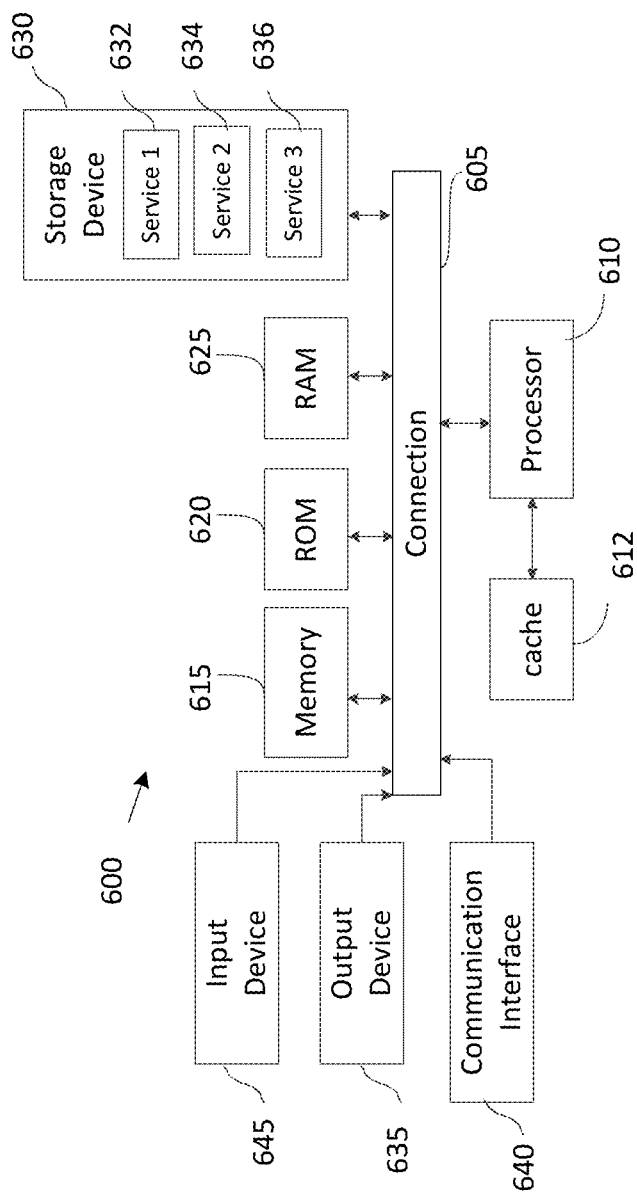
FIG. 7 illustrates an example computing system for use in accordance with some aspects of the present technology.

FIG. 7 shows an example of computing system 600, which can be for example any computing device making up conference room endpoint 302, conference service 304, user equipment 308, fingerprint service 320, or meeting room identification service 350 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method of matching conference room audio samples, the method comprising:
   decomposing a first audio segment and a second audio segment into a plurality of frequency bins within a range of frequencies;
   adjusting an amplitude of frequencies in the frequency bins having an amplitude above an amplitude threshold;
   for each of the frequency bins for the decomposed first audio segment and the decomposed second audio segment, zeroing out any data points below a determined threshold to result in a first fingerprint for the first audio segment and a second fingerprint for the second audio segment;
   normalizing the first audio fingerprint and the second audio fingerprint; and
   determining that a cross-correlation value of the first audio fingerprint relative to the second audio fingerprint is above a cross-correlation threshold.

2. The method of claim 1, comprising:
   recording the first audio segment by a first computing device in a meeting environment, wherein the first audio segment was received from a conference service and was played by a conference speaker in the meeting environment with the computing device; and
   preventing playback of the second audio segment by the first computing device in response to the determination that the cross-correlation value is above the cross-correlation threshold, wherein the second audio segment was received from the conference service.

3. The method of claim 1, comprising:
   receiving the decomposed and adjusted first audio segment from a first source;
   receiving the decomposed and adjusted second audio segment from a second source; and
   in response to the determination that the cross-correlation value is above the cross-correlation threshold, determining that the first source and the second source are in a same meeting environment.

4. The method of claim 1, comprising:
   prior to the determination of that the cross-correlation value is above the cross-correlation threshold, offset the start of one of the first audio segment or the second audio segment relative to the other.

5. The method of claim 1, wherein the adjusting the amplitude of frequencies in the frequency bins having the amplitude above the amplitude threshold comprises:
   flattening the amplitudes to enhance low level spectral components and attenuate high level spectral components of the first audio segment and the second audio segment.

6. The method of claim 1, wherein the amplitude threshold is 0.1 dB.

7. The method of claim 1, comprising:
   prior to the decomposing of the first audio segment and the second audio segment, equalize the first audio segment and the second audio segment.

8. The method of claim 1 comprising:
   prior to the determining that the cross-correlation value is above the cross-correlation threshold, and for the frequency bins for the decomposed first audio segment and the decomposed second audio segment, computing an amount of energy;
   keeping the frequency bins representing a determined fraction of the a total amount of energy from the frequency bins to result in the first fingerprint for the first audio segment and the second fingerprint for the second audio segment.

9. The method of claim 1, wherein the decomposing of the first audio segment and the second audio segment into the plurality of frequency bins is performed using a short-term fourier transform.

10. A computer-readable medium comprising instructions stored thereon, the instructions effective to cause a computing system to:
    decompose a first audio segment and a second audio segment into a plurality of frequency bins within a range of frequencies;
    adjust an amplitude of frequencies in the frequency bins having an amplitude above an amplitude threshold;
    for each of the frequency bins for the decomposed first audio segment and the decomposed second audio segment, zero out any data points below a determined threshold to result in a first fingerprint for the first audio segment and a second fingerprint for the second audio segment;
    normalize the first audio fingerprint and the second audio fingerprint; and
    determine that a cross-correlation value of the first audio fingerprint relative to the second audio fingerprint is above a cross-correlation threshold.

11. The computer-readable medium of claim 10, wherein the instructions are effective to cause the computing system to:
    record the first audio segment by a first computing device in a meeting environment, wherein the first audio segment was received from a conference service and was played by a conference speaker in the meeting environment with the computing device; and
    prevent playback of the second audio segment by the first computing device in response to the determination that the cross-correlation value is above the cross-correlation threshold, wherein the second audio segment was received from the conference service.

12. The computer-readable medium of claim 10, wherein the instructions are effective to cause the computing system to:
    receiving the decomposed and adjusted first audio segment from a first source;
    receive the decomposed and adjusted second audio segment from a second source; and
    in response to the determination that the cross-correlation value is above the cross-correlation threshold, determine that the first source and the second source are in a same meeting environment.

13. The computer-readable medium of claim 10, wherein the instructions are effective to cause the computing system to:

flatten the amplitudes to enhance low level spectral components and attenuate high level spectral components of the first audio segment and the second audio segment.

14. The computer-readable medium of claim 10, wherein the instructions are effective to cause the computing system to:

prior to the determination that the cross-correlation value is above the cross-correlation threshold, and for the frequency bins for the decomposed first audio segment and the decomposed second audio segment, computing an amount energy; and keep the frequency bins representing a determined fraction of a total amount of energy from the frequency bins to result in the first fingerprint for the first audio segment and the second fingerprint for the second audio segment.

15. The computer-readable medium of claim 10, wherein the instructions are effective to cause the computing system to:

prior to the decomposing of the first audio segment and the second audio segment, equalize the first audio segment and the second audio segment.

16. A system comprising:

a computer-readable medium including instructions stored thereon, the instructions effective to cause a computing system to:

decompose a first audio segment and a second audio segment into a plurality of frequency bins within a range of frequencies;

adjust an amplitude of frequencies in the frequency bins having an amplitude above an amplitude threshold;

for each of the frequency bins for the decomposed first audio segment and the decomposed second audio segment, zero out any data points below a determined threshold to result in a first fingerprint for the first audio segment and a second fingerprint for the second audio segment;

normalize the first audio fingerprint and the second audio fingerprint; and determine that a cross-correlation value of the d first audio fingerprint relative to the second audio fingerprint is above a cross-correlation threshold.

17. The system of claim 16, wherein the instructions are effective to cause the computing system to:

flatten the amplitudes to enhance low level spectral components and attenuate high level spectral components of the first audio segment and the second audio segment.

18. The system of claim 16, wherein the instructions are effective to cause the computing system to:

prior to the determination that the cross-correlation value is above the cross-correlation threshold, and for the frequency bins for the decomposed first audio segment and the decomposed second audio segment, computing an amount of energy; and keep the frequency bins representing a determined fraction of a total amount of energy from the frequency bins to result in the first fingerprint for the first audio segment and the second fingerprint for the second audio segment.

19. The system of claim 16, wherein the instructions are effective to cause the computing system to:

prior to the decomposing of the first audio segment and the second audio segment, equalize the first audio segment and the second audio segment.

20. The system of claim 16, wherein the range of frequencies are frequencies of a public switched telephone network (PSTN).

* * * * *